RE 25079
July 7, 1959     A. S. KOLLOCK     2,894,141
FILM HOLDER
Filed May 8, 1957
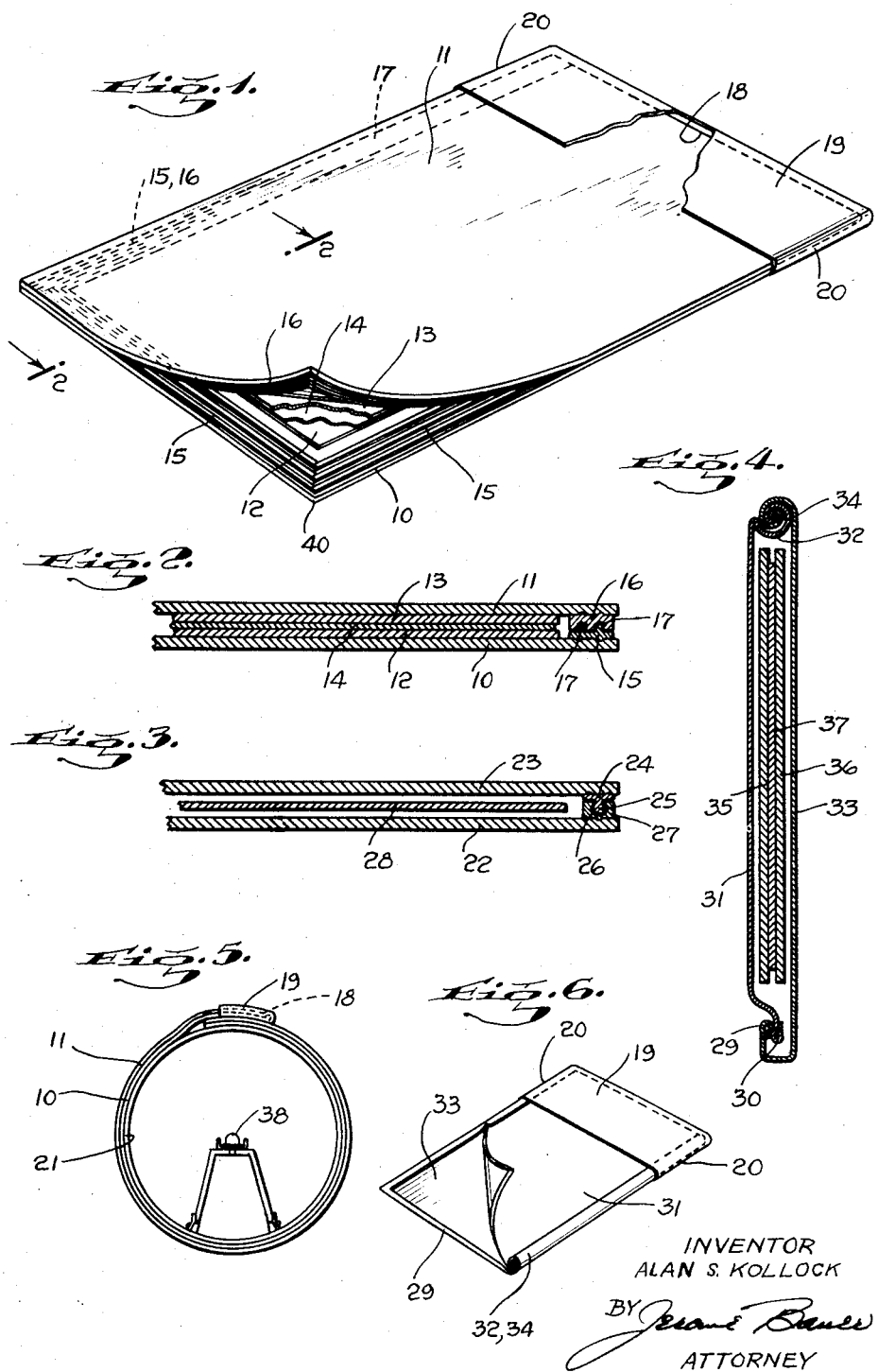
INVENTOR
ALAN S. KOLLOCK
BY *Jerome Bauer*
ATTORNEY

United States Patent Office 2,894,141
Patented July 7, 1959

2,894,141

FILM HOLDER

Alan S. Kollock, New Hyde Park, N.Y.

Application May 8, 1957, Serial No. 657,797

8 Claims. (Cl. 250—68)

This invention relates to film cassettes and more particularly to a film holder adapted to completely protect the X-ray film against accidental exposure to light or other radiation while being readily conformed to surfaces of all shapes during radiographic exposure.

The use of X-ray photography in order to examine castings and welds to determine whether imperfections or flaws during manufacture were inherent in the structures, has become one of wide application in industry. In practice a film holding cassette is placed against the object being tested and is exposed to a source of radiation. After the film is developed, existing flaws are thereby readily detected upon examination of the film. This form of radiography is not limited to structural examination but is also of value in diagnosis in medicine. Thus, in chest examinations of patients suspected of having tuberculosis, the use of radiographs has been of great value.

To provide the best results, the film cassette or holder must be deformable to conform to the contour of the object being examined. This may be understood more clearly by reference to the Boucher Patent 2,494,740 wherein the film is retained along its sides by a flexible holder 15. In prior constructions film holders of the same general class were relatively stiff. They were of the same size as the film and tightly contained the film therein in such manner that when the holder and its contained film were bent about a surface, the film was allowed no movement, hence the holder buckled and prevented the film from moving into conformance with the item to be radiographed. Accordingly, the bent film buckled within its tight holder. This buckling resulted in a distortion of the image photographed on the film and resulted in misinterpretations of the condition of the material radiographed.

Boucher treats this distortion by containing the film only along its sides and permits the same to move relative to the holder when they are bent to conform to a surface. This relative movement eliminates relative buckling of the elements but, at the same time, it has been found to create a light problem at the ends of the film. That is, light can enter about the ends of the film and obscure the image.

It has been found that if the sides of the cassette are not secured together to allow all of the members to adjust to the curvature of the item to be radiographed, correct exposure of the film will result. The film cassette of this invention has resolved this problem in a novel manner whereby undistorted radiographs are obtained without danger of exposure to light.

It is an object of the invention to provide a film holder or cassette adapted to fully protect the film therein, allowing the same to flex without buckling, while conforming to the exterior surface of an object to be radiographed.

It is another object to provide a film cassette in which the several parts are movable relative to each other without exposure to light.

It is still another object to provide a film cassette sandwich that is easily separated in order to receive an X-ray film and is then securely sealed together by soft pressure quickly and easily applied thereto, whereby exposure of the film to light is avoided.

It is still another object to provide a film cassette whereby the plate members of the cassette sandwich additionally have the function of supporting the sealing means preventing exposure to the light.

And it is yet a further object to provide a device that is relatively inexpensive to manufacture yet is durable in construction for its intended purpose.

These and many other objects and advantages of the constructions herein shown will become apparent as the description thereof, in conjunction with the drawing, proceeds.

Fig. 1 is a perspective view of one form of the invention showing a cassette or film holder in accordance with the teaching of the invention;

Fig. 2 is a section taken on lines 2—2 of Fig. 1;

Fig. 3 is a section similar to that of Fig. 2 but illustrating another form of the invention;

Fig. 4 is a section similar to that of Fig. 3 but illustrating still another embodiment of the invention, and Fig. 5 illustrates one method for applying the cassette of the invention to a cylindrical object.

Fig. 6 is a perspective view of the embodiment shown in Fig. 4.

Referring to Figs. 1 and 2 wherein there is illustrated a film holding cassette comprising flexible or deformable plates 10 and 11 of sheet-like material. The plates 10 and 11 cooperate to retain therein a pair of lead foil or other intensifying screen sheets 12 and 13 in opposed and spaced relationship. Positioned between the spaced screen members 12 and 13 is an X-ray film 14 utilized to detect flaws in structural material or for other radiographic purposes.

The flexible plate members 10 and 11 are preferably of opaque, plastic composition, such as a vinyl resin. The plate members are capable of being bent or twisted into any necessary shape to conform with the surface against which they are positioned.

The plate members 10 and 11 are likened to the form of a sandwich and are separated from each other by the opposing track means in the form of slide fastener members or "zippers" 15 and 16. The fastener members 15 and 16 each include co-acting cooperating L-shaped tongue and groove track members 17 that may be "zippered" together to secure the plates 10 and 11 together.

In carrying out the objects of the invention, it is necessary that the plates 10 and 11 be permitted relative movement. To do this, the cooperating tongues and grooves of tracks 17 do not mesh in tight frictional engagement. Their cooperation is such as to engage each other to prevent separation of the plates 10 and 11 but to allow movement between the tongues and grooves to permit the plate 10 to move relative to the plate 11 along the length of the "zipper."

As is apparent from Fig. 1 of the drawing, the cooperating slide fasteners 15, 16 and their co-acting tongue and grooves 17 are provided on the peripheral edges along three sides of the plate members 10 and 11. The fourth side of each of the plate members contains no sliding means. At this fourth side, the plate member 11 is slightly shorter in length than the plate member 10, as is apparent from the dotted line 18, in Fig. 1.

To prevent light from entering the cassette at the unsecured end 18, a flap member 19 is provided to cover the same lightly-tightly. Flap cover 19 extends beyond and upwardly from the edges of the plate member 10 and overlies the plate member 11 at the side 18. A pair of side tab members 20, depending from the flap 19, are secured to the plate member 10 to form a retaining pocket for the short end 18.

It is apparent that when the cassette is assembled, the tongue and groove constructions 17 afforded by their slidable fasteners 15 and 16, together with the pocket formed by the flap and tab construction 19, 20 insures a complete light proof cover for the X-ray film 14 contained therein.

The advantages of the invention are best illustrated in Fig. 5 wherein a film cassette, long enough to extend around the outer circumference of the cylinder 21 and to photograph the same, is shown.

If a prior art film holder or cassette were employed, wherein the screens 12 and 13 and film 14 were limited against relative movement within the same, a buckling between the elements would result because each element being wrapped about the cylinder 21 would be forced to conform to the same radius as that of the innermost element. In attempting to conform to the same radius, the successive outer elements would separate from each other in a radial direction, being limited against relative longitudinal movement. This results in a buckling action and a consequent distortion of the radiographed image.

With the construction of the cassette of this invention, however, the plate member 11 will move relative to the length of the plate member 10 along the cooperating tracks 17 formed by cooperating slide fasteners 15 and 16. Hence, compensation for the difference in diameters of the circles formed by each of these members would be automatically accommodated by the zipper construction. The slightly shorter length of the plate member 18 enables this relative movement and adjustment between the members 10 and 11 to take place without binding at the free edges thereof beneath flap 19.

In use, when a new film 14 is to be inserted into the cassette, a corner or edge of the opposing plate members 10 and 11 is grasped and the plates are separated and pulled apart gently at the cooperating zipper 17. The resilient construction of the track members 15 and 16 allows the cooperating tongue and groove portions 17 to separate without damage. The degree of separation of the members 10 and 11 is but a matter of choice. Since the separation occurs along the zipper which may be secured together again, after a new film is inserted between the plate members 10 and 11, they are placed in juxtaposition with the tongues and grooves 17 aligned for cooperation. Then simple pressure applied along the edges thereof above the members 15 and 16 in a manner moving lengthwise along the edges, will press the tongues and grooves into progressive engagement.

Various methods for securing the slide fasteners to the inner edges of the cassette could be utilized. This could be done by heat treatment or through adhesive means. The slide fastener could also be secured directly to the intensifying screen members 22 and 23, as is shown in Fig. 3.

In this form of the invention, the track means is slightly different in construction from that previously described. A slide member 24 is fastened directly to the lead foil member 23 and terminates in an enlarged tongue 25 adapted to ride in a track or groove 26 formed in the slide member 27. The slide member 27 is fastened directly to the lead foil member 22. Enough clearance is provided between the tongue 25 and groove 26 to assure free sliding movement therebetween. As before, an X-ray film 28 is retained between the foil members 22 and 23. In this form of the invention, the lead foil intensifying screens 22 and 23 become the sides of the cassette that is to be wrapped directly around the conduit 21.

The invention is further illustrated in the embodiment of Fig. 4. Three sides of the cassette are provided with overlapping securing members or slide fasteners 29 and 30 as was described previously. The plate member 31 of the cassette sandwich is bent back slightly upon itself and is then curled along one of its edges in the form of a whorl or hinge 32. The other plate or side 33 of the cassette sandwich is continued as a whorl or hinge 34 in complementary relation with the whorl 32. In this manner, a flexible yet light-proof container for the intensifying screen members 35, 36 and the X-ray film 37, is provided. In this form of the invention, the cooperating hinge members 32 and 34 are formed along one side of the cassette and are movable relative to each other to provide adjustment for the curvature of the member (21) about which they are to conform.

It will be understood that the embodiment of the invention disclosed in Fig. 4 is intended to operate in substantially the same manner as the embodiments previously described except, however that in the instant structure, the plate members 31 and 33 have relative longitudinal movement at their hinges 32, 34 along one side thereof and at the overlapping securing members 29, 30 along the other side edge thereof. The two plates 31 and 33 being equivalent to the plates 10 and 11 of the embodiment shown in Fig. 1, are covered at their one end by a flap 19 (see Fig. 6) the same as is shown in the embodiment in Fig. 1. The cooperating overlapping members 29 and 30 extend along one edge and around the end of the cassette opposite the flap 19. Hence, the securing cooperating members 29 and 30 will extend along one longitudinal edge and one side (the side opposite the covering flap 19) of the cassette, while the cooperating hinge structure 32, 34 will extend lengthwise along the remaining edge of the cassette to beneath the flap 19.

It will be understood that when the cassette is to be opened, a corner thereof wherein the overlapping securing fasteners 29 and 30 are provided and meet, will be opened by lifting the slide 29 off of and from cooperating engagement with the remaining slide 30. The two plate members 31 and 33 are thus separated at the fastener 29, 30 all along their lengths in the manner shown in Fig. 6, along the one longitudinal edge and end of the cassette. Once opened as described, the plates may be completely disengaged from each other by sliding them relative to each other at the hinge 32, 34. It is obvious that the film 37 and intensifying screens 35 and 36 may be inserted between the plates 31 and 33 when they are so opened.

To close these plates, it is merely necessary to pivot the plate member 31 down into closing relationship to the plate 33. The shorter member 31 is then slid beneath flap 19 and the slide fastener 29 is manipulated to cover its cooperating fastener 30. Hence the cassette will be closed on all three of its sides while the shorter plate 31 will be covered at one unsecured end by the light proof flap 19.

In the prior described embodiments of Figs. 1, 2 and 3, the slide fasteners must be fitted together at the corners 40 (Fig. 1) of the cassette. Here again, to insure a light proof structure, the joining fastener members are not mitered, but rather, are secured together in a stepped relationship as shown in Fig. 1. This stepped relationship serves as a baffle to prevent the light from entering the interior of the cassette at the corners thereof.

It has been found in practice that because the cassette is flexible, when these corners at which the fasteners meet are of mitered construction, flexing of the overall structure opens the miter joint slightly, resulting in the penetration of light therethrough. The stepped construction shown at the corner 40 in Fig. 1 prevents the entrance of light into the cassette by creating a baffle at the corner. Hence, although flexing of the cassette is still permitted, this arrangement of structure sufficiently baffles the light to prevent its entry into the cassette.

The principle of the invention is adaptable to many forms and uses. The slidable construction of the plates of the cassette allows photographing of objects of different shapes. The film holder can be utilized in all lengths, from small plate size to any desired continuous length without sacrifice of clarity of the X-ray pictures taken. There is no possibility for light to enter the cassette since the interlocking nature of the slide fastener track means and end flap construction 19 effectively excludes this. On the other hand, and in distinction from the Boucher disclosure, it will be recognized by those skilled in the art that there are no grooves or other structural obstructions between the film in the cassette and the penetrating rays emitted by the X-ray tube or radiating material 38. In this invention the film is unobstructed resulting in a clear, undeformed true representation of the thing photographed.

Obviously many other longitudinally slidable constructions may be utilized within the scope of the invention. For example, a flat member having inturned longitudinal flanges to form a track could be secured to one plate of the cassette while a pair of longitudinal strips depending from the other plate of the cassette could ride in the track to provide a simplified modification of the invention.

Having thus described the invention, it is obvious that various immaterial modifications may be made in the same without departing from the spirit of the invention and that it is to be understood that the invention is not limited to the exact form, arrangement, construction and combination of parts herein shown and described, except as defined within the limits of the appended claims:

What I claim is:

1. A film holder adapted to receive and retain a negative without exposure to light comprising a pair of flat sheet-like members positioned in overlying relation, separable interengaging fastener means comprising tongues and grooves means secured to each of said sheet-like members to separably fasten said members in interengaging relationship and to provide a sliding movement along the lengths of said members, and means enclosing one side of said sheet-like members to prevent light from entering therebetween.

2. A film holder adapted to retain a negative without exposure to light, comprising a pair of flat sheet-like plates positioned in overlying relation, track means secured along the longitudinal inner edges of said plates on three sides thereof, said track means having cooperating tongue and groove means providing a longitudinal sliding relationship between the plates, and means enclosing the longitudinal edges of the fourth sides of said plates to prevent light from entering therebetween.

3. A film holder adapted to retain a negative without exposure to light comprising a pair of flat, sheet-like plate members positioned in overlying relation, fastener means secured along the longitudinal inner edges of each of said plates on three sides thereof said fastener means including interengageable tongue and groove means and providing a longitudinal sliding relationship between the plates and to fasten said plates together, and one of said sheet-like plates being shorter in length than the other.

4. A film holder adapted to retain a negative without exposure to light comprising a pair of flat, sheet-like plate members positioned in overlying relation, fastener means secured along the longitudinal inner edges of said plates on three sides thereof and providing a longitudinal sliding relationship between the plates, and one of said sheet-like plates being shorter in length than the other, said fastener means comprising a substantially L-shaped tongue and groove cooperable to prevent the plates from separating.

5. The combination of claim 4, wherein a flap member extends beyond the side of one plate member and is folded over the other plate member to prevent light from entering between said members.

6. The combination of claim 4, wherein said fastener means comprises an enlarged tongue and groove cooperable to prevent the plate members from separating.

7. A film holder comprising a pair of flat sheet members in overlying relation, fastener means along the longitudinal inner edges of said members on three sides thereof to provide a longitudinally sliding relationship therebetween, one of said members being shorter in length than the other, said fastener means including enlarged cooperable tongue and groove means operable to secure said members together and operable to enable the same to be separated, and flap means extending beyond the side of one of said members and being folded over the other of said members to prevent light from entering therebetween.

8. The combination of claim 7, wherein said members are intensifying screens.

References Cited in the file of this patent

UNITED STATES PATENTS

| | | |
|---|---|---|
| 2,371,843 | Powers | Mar. 20, 1945 |
| 2,390,211 | Forssell | Dec. 4, 1945 |
| 2,494,740 | Boucher | Jan. 17, 1950 |